(12) United States Patent
Marcos et al.

(10) Patent No.: US 10,688,851 B2
(45) Date of Patent: Jun. 23, 2020

(54) VEHICLE SUN VISOR WITH SLIDE ON ROD FUNCTION

(71) Applicant: GRUPO ANTOLIN-INGENIERIA, S.A.U., Burgos (ES)

(72) Inventors: Ignacio Marcos, Burgos (ES); Patrick Georges, Burgos (ES)

(73) Assignee: GRUPO ANTOLIN-INGENIERIA, S.A.U., Burgos (ES)

( * ) Notice: Subject to any disclaimer, the term of this patent is extended or adjusted under 35 U.S.C. 154(b) by 146 days.

(21) Appl. No.: 16/045,426

(22) Filed: Jul. 25, 2018

(65) Prior Publication Data
US 2019/0047384 A1 Feb. 14, 2019

(30) Foreign Application Priority Data

Aug. 11, 2017 (EP) .................................... 17382566

(51) Int. Cl.
*B60J 3/02* (2006.01)
(52) U.S. Cl.
CPC ........... *B60J 3/0239* (2013.01); *B60J 3/0204* (2013.01); *B60J 3/0265* (2013.01); *B60J 3/0278* (2013.01)
(58) Field of Classification Search
CPC ........... B60J 3/0239; B60J 3/0204; B60J 3/02
USPC ....................................................... 296/97.11
See application file for complete search history.

(56) References Cited

U.S. PATENT DOCUMENTS

| | | | |
|---|---|---|---|
| 7,281,751 B2 * | 10/2007 | Hamelink | B60J 3/0239 296/97.11 |
| 7,798,551 B2 | 9/2010 | Okazaki et al. | |
| 7,926,864 B2 | 4/2011 | Welter | |
| 8,905,457 B2 | 12/2014 | Mertz | |
| 2008/0093876 A1 * | 4/2008 | Olep | B60J 3/0204 296/97.11 |

(Continued)

FOREIGN PATENT DOCUMENTS

| | | |
|---|---|---|
| DE | 4104032 C1 | 4/1992 |
| DE | 102006043206 A1 | 2/2008 |

(Continued)

OTHER PUBLICATIONS

Extended European Search Report dated Feb. 13, 2018 re: Application No. 17382566.2, pp. 1-5, citing: DE 10 2006 043206 A1, EP 3 189 995 A2, WO 2006/026269 A2, EP 1 698 500 A1 and DE 41 04 032 C1.

*Primary Examiner* — Hilary L Gutman
(74) *Attorney, Agent, or Firm* — Cantor Colburn LLP

(57) ABSTRACT

A vehicle sun visor includes an L-shaped rod fixed to the vehicle and a screen rotatably mounted on and slidable on the rod along a sliding direction parallel to a longitudinal axle thereof. The sun visor includes a detent clip coupled to the rod to establish controlled and stable predefined rotational positions of the screen defining at least a first screening position and an inoperative position. The visor further includes a carrier rotatably attached to the rod and housed in a guiding profile of the screen such that the screen is movable between two end positions of the sliding movement of the screen along the rod, defining two end positions. The carrier includes a rotary slider, a floating slider, and a metal spring elastically coupling the floating and rotary sliders. The carrier includes a first retention component engageable with a second retention component in the screen at one of the end positions.

10 Claims, 5 Drawing Sheets

(56) References Cited

U.S. PATENT DOCUMENTS

| | | | | |
|---|---|---|---|---|
| 2010/0013263 A1* | 1/2010 | Okazaki | ................ | B60J 3/0265 |
| | | | | 296/97.11 |
| 2017/0174051 A1* | 6/2017 | Welter | ................... | B60J 3/0204 |
| 2019/0381869 A1* | 12/2019 | Kwon | .................... | B60J 3/0252 |

FOREIGN PATENT DOCUMENTS

| | | | | |
|---|---|---|---|---|
| EP | 1698500 A1 | 9/2006 | | |
| EP | 3189995 A2 | 7/2017 | | |
| FR | 3047929 A1 * | 8/2017 | ............ | B60J 3/0239 |
| JP | 2014121919 A | 7/2014 | | |
| WO | 2006026269 A2 | 3/2006 | | |
| WO | 2014132569 A1 | 9/2014 | | |

* cited by examiner

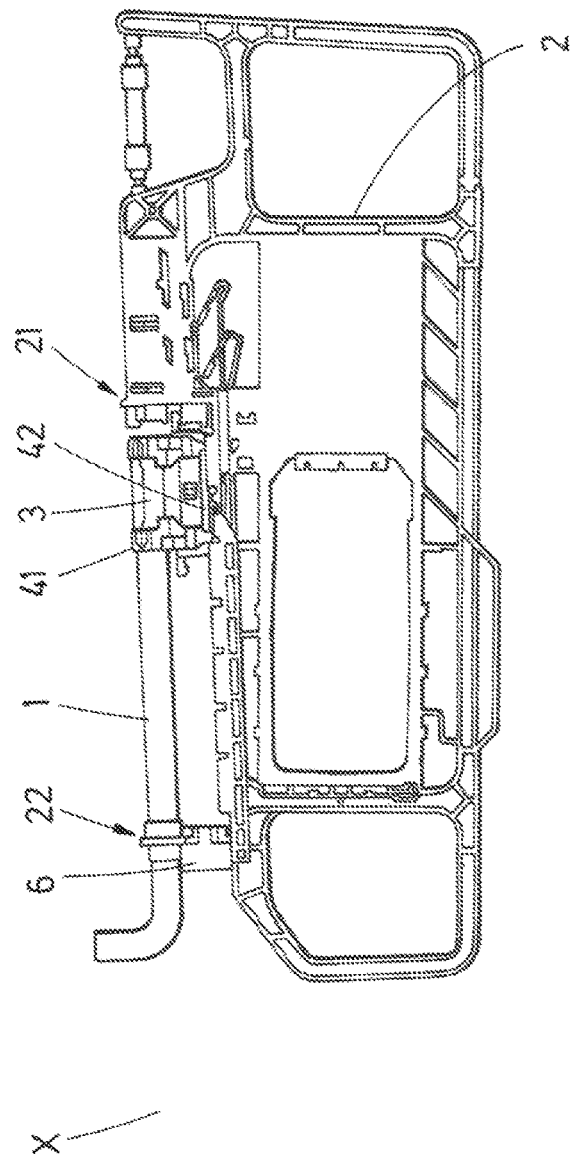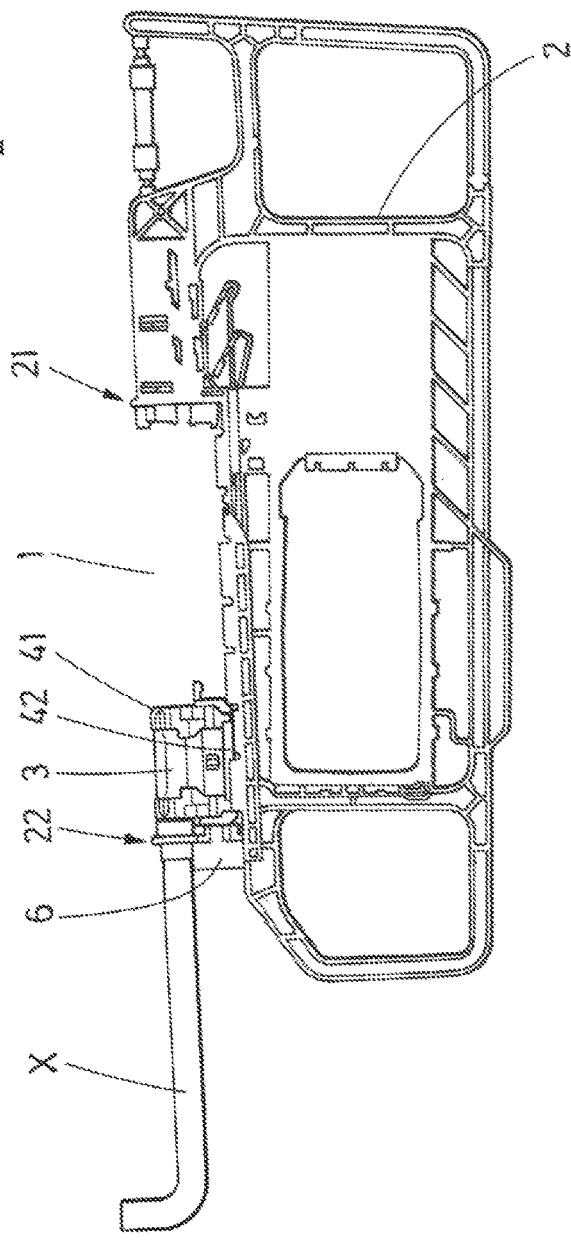

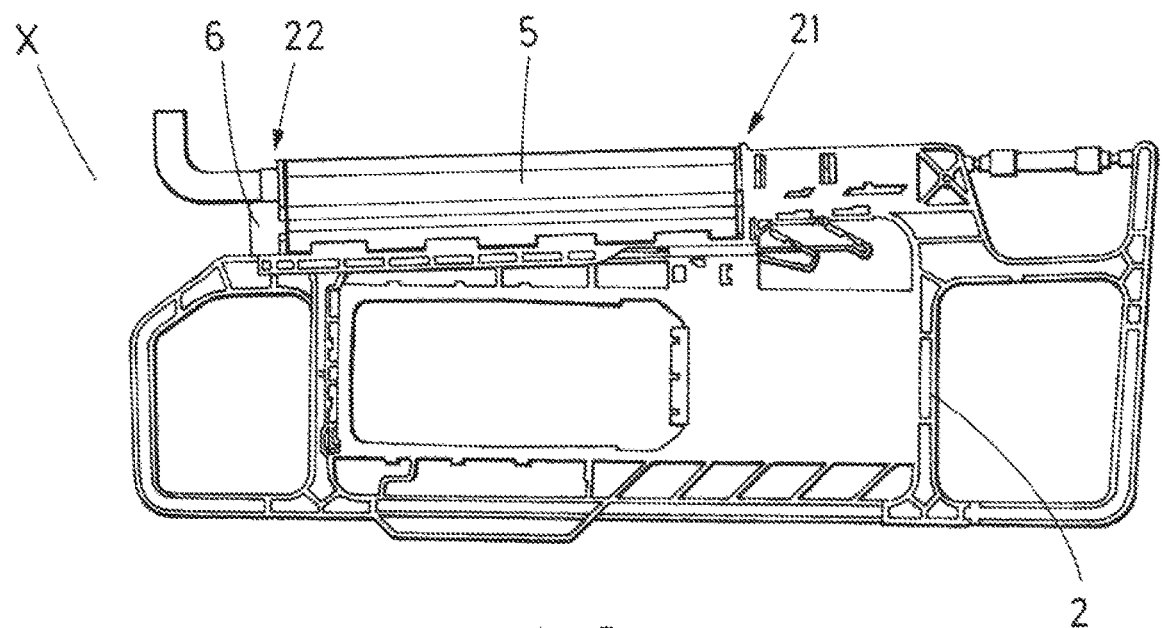
FIG.3
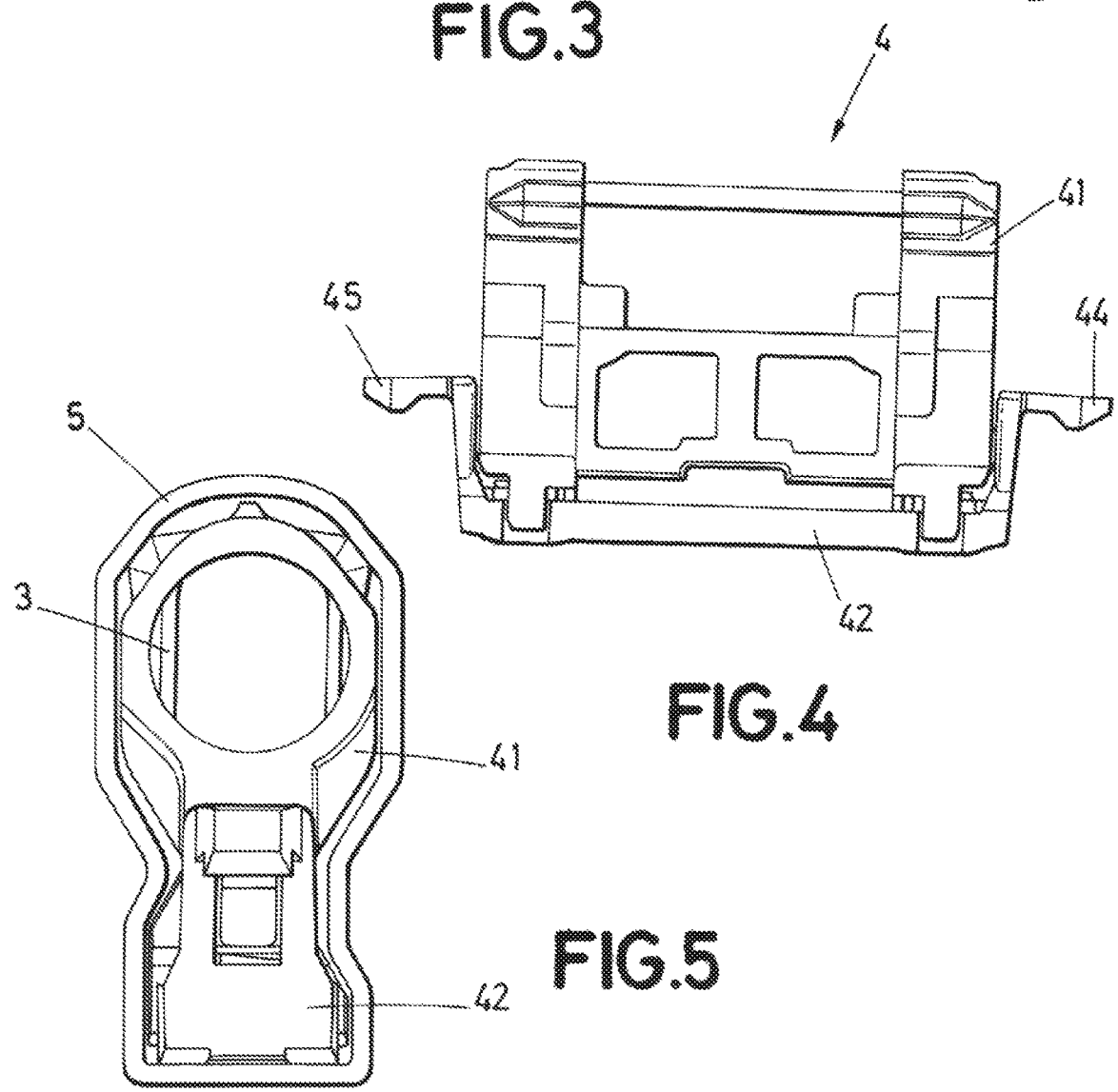
FIG.4
FIG.5

VEHICLE SUN VISOR WITH SLIDE ON ROD FUNCTION

CROSS REFERENCE TO RELATED APPLICATIONS

This application is related to and claims the benefit of European patent application no. 17382566.2, filed on Aug. 11, 2017, the contents of which are herein incorporated by reference in their entirety.

TECHNICAL FIELD

The present disclosure relates to sun visors for vehicles and more especially to sun visors with slide on rod (SOR) function comprising retention means in one end position of the screen along the rod.

BACKGROUND

Sun visors for vehicles sometimes incorporate a so called slide on rod (SOR) function which allows the sliding of the screen along the rod to provide an additional covering area when the sun-visor is placed at a lateral position, by the side window of the vehicle.

SOR sun visors comprise a carrier or slider that holds a detent clip that allows rotational movements to the screen around the rod, predefining at least a preferred angle position. The carrier is housed in an inner guiding channel of the screen that blocks the relative rotational movement between the carrier and the screen, but allows guided longitudinal movement such that the screen can slide over the carrier from a non-extended position to an extended position. The guiding channel can be provided by the inner structure of the screen in twinshell sun visors or by an additional guiding tube incorporated inside the screen.

The guided movement of the screen requires a free-play compensation between the carrier and the inner channel to assure a regular and steady effort for sliding the screen over the carrier.

It is also important to have a run-end retention of the guiding movement of the screen to provide some extra effort at the time of detaching from or clipping to one run-end position, to have a notice that the sun visor is at such run-end position.

It is known in the art the use of flexible plastic retention clips fitting in corresponding retention housings, placed in the slider and the screen respectively to provide a run-end retention of the sliding movement. The retention is obtained by the flexibility of the plastic retention means.

JP-2014-121919-A is an example of this kind of flexible retention. It describes a protuberance 220 comprising a hooking portion that engages and disengages with the engagement parts 16 and 17 of the slider. The protuberance 220 flexes and deforms, such that the restoring force in the engagement direction is imparted by the elasticity of the side face 103 of the screen, being noticed by the user.

WO-2014132569-A1 is another example of flexible retention. In this case the patent describes an engaging claw 36 which can be flexed in a direction orthogonal to the axial direction. The engaging claw 36 is engaged with the axial end portion 17f of the accommodating space 17 when the main body 22 abuts on the axial end of the accommodating space 17 by sliding the shield 16.

In U.S. Pat. No. 7,798,551-B2 the locked position is define by the sizes of the protrusions and engagement holes, defining with these dimensions the suitable insertion resistance, and fixing in this manner the sun visor body at both ends.

A first problem of these plastic clips working at flexion is that they suffer from permanent deformation, material ageing, and they are sensible to temperature, what means that it is not possible to guarantee its functional durability in all kind of conditions and through the time.

Furthermore, as the retention clips are arranged in the carrier and the housing are in the screen, any possible misalignment between the screen and carrier (due to free-play and manufacturing tolerances) provokes misalignments between the retention clips and their corresponding housings in the screen. This implies a variable retention force and the possibility of unexpected detachment or even a retention attachment not being possible, or even permanent damages.

To solve the problem of misalignment between the sun visor screen and the carrier, and the absorption of any free-play inside the guiding profile, in some sun visors the carrier comprises floating sliders which, in addition, improve the sliding efforts and noises.

One example of this is described in U.S. Pat. No. 8,905,457-B1 that describes a floating slider with means for limiting the stroke of the sliding movement, but no retention is used for maintaining the run-end position.

Another example of sun visor with a floating slider is described in U.S. Pat. No. 7,926,864-B2. In this case the sun visor also shows flexible retention means comprising flexible tongues 8 disposed in two plugs 7 at the ends of the guiding profile 4 for fitting in the corresponding engagements in the slider 2. This flexible retention means have the same problem described previously for the plastic clips working at flexion.

SUMMARY

The present disclosure relates to a sun visor with SOR function comprising
  an L shaped rod rotatably attached to the vehicle and,
  a screen rotatable mounted on the rod and slidable on the rod, along a sliding direction parallel to a longitudinal axle of the rod,
  a detent clip coupled to the rod to establish controlled stable predefined rotational positions of the screen, defining at least an screening position and an inoperative position;
  and a carrier rotatably attached to the rod and housed in a guiding profile of the screen, between two run ends, such that the guiding profile guides the sliding movement of the screen between the two run ends, defining a first end position, where the screen is not extended in relation to the rod, and a second end position where the screen is extended.
  The carrier comprises
  a rotary slider, where the detent clip is attached, configured to rotate around the rod but without sliding along the rod,
  a floating slider and
  a metal spring elastically coupling the floating and rotary sliders such that the floating slider is movable in relation to the rotary slider in a direction orthogonal to the sliding direction. The metal spring ensures the contact of the floating slider on the guiding profile, and prevents possible free-plays and misalignments of the carrier and the screen assuring a regular and steady effort for sliding the screen over the carrier, and an extra effort at the time detaching and clipping at the run-end.

The carrier further comprises first retention means engageable with second retention means provided at one of the run ends of the screen.

According to the disclosure the first retention means are mounted in the floating slider such that the first retention means are engageable to the second retention means by a relative movement of the floating slider in relation to the screen, in the direction orthogonal to the sliding direction, against the force exerted by the metal spring. The retention coupling obtained provides clipping/detaching efforts detectable by the user, and prevents an unintentional screen sliding. Furthermore the retention is not affected by deformation, material ageing or temperature because it is not obtained by flexible deformation of any of the retention means but instead by an up/down movement of the floating slider.

The first and second retention means are configured to provide retention of the screen either, at a first end position at one run end of the screen, or at a second end position at the other run end of the screen. That means that the second retention means can be arranged at any of the two run ends of the screen.

The stiffness of the metal spring is chosen to assure, on one hand the desired predefined sliding efforts (adjustable), and on the other and the detachment and clipping efforts at a run-end.

In some embodiments the floating slider has third retention means at an opposite end of the run end of the first retention means, and the screen has fourth retention means. This configuration allows two clipped positions of the screen, to establish retention at both, the first end position, and the second end position. That means that the second retention means are placed at one of the two run ends of the screen and the fourth retention means are placed at the other run end of the screen.

Additionally, in some embodiments the floating slider is symmetrical. This configuration allows the indistinct use of the same floating slider for right hand and left hand sun visors.

The first retention means can be a hook or a housing. In some embodiments the hook or the housing comprises a cam slope to convert the movement of the screen in the sliding direction into the relative movement of the floating slider in the orthogonal direction.

The second retention means can be a hook or a housing. In some embodiments the hook or the housing comprises a cam slope to convert the movement of the screen in the sliding direction into the relative movement of the floating slider in the orthogonal direction.

In some embodiments the metal spring is a coil spring.

Another aspect of the disclosure relates to a vehicle comprising a sun visor as previously described.

BRIEF DESCRIPTION OF THE DRAWINGS

To complete the description and in order to provide for a better understanding of the disclosure, a set of drawings is provided. The drawings form an integral part of the description and illustrate an embodiment of the disclosure, which should not be interpreted as restricting the scope of the disclosure, but just as an example of how the disclosure can be carried out. In the figures:

FIG. 1 shows a sun visor with the screen in the first end position, where the screen is not extended;

FIG. 2 shows a sun visor with the screen in the second end position, where the screen is completely extended;

FIG. 3 shows a sun visor with a guiding tube;

FIG. 4 shows a schematic view of the carrier according to the disclosure;

FIG. 5 shows a carrier housed inside a guiding tube;

DETAILED DESCRIPTION OF THE DRAWINGS

Figure 6:
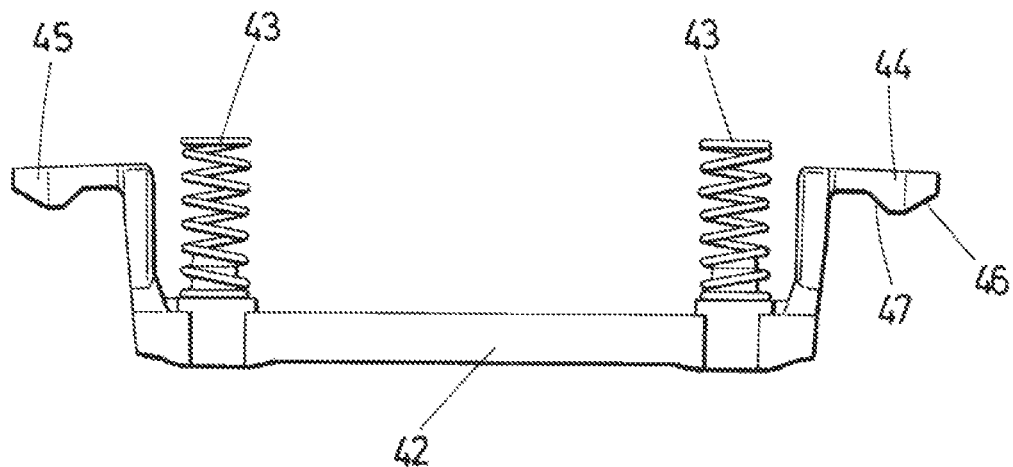
FIG. 6 shows a floating slider with two coil springs.
Figure 7:
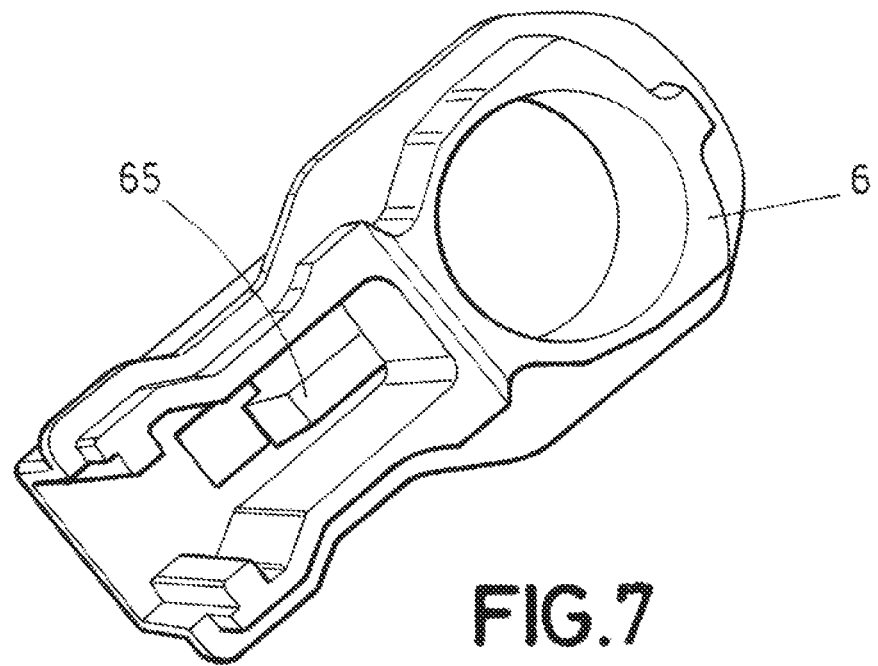
FIG. 7 shows a plug defining a second end position for the screen.

FIG. 1 shows a vehicle sun visor with slide on rod function comprising an L shaped rod 1 fixed to the vehicle, a screen 2 rotatable around the rod 1 and slidable on the rod 1 along a sliding direction X parallel to a longitudinal axle of the rod 1.

The sun visor also comprises a detent clip 3, assembled to the carrier 4, and both coupled to the rod 1, to establish controlled stable predefined rotational positions of the screen 2, and the carrier 4 is housed in a guiding tube 5 of the screen 2 as shown in FIG. 3, such that the screen 2 is movable between two run ends (21, 22), to define a first end position, where the screen is not extended in relation to the rod as represented in FIG. 1, and a second end position where the screen is extended as represented in FIG. 2. The sun visor can be also a twin shell sun visor, in which case, instead of using the guiding tube 5, the inner structure of the two shells defines a guiding profile such that the guiding tube is not necessary.

The carrier, as shown in FIGS. 4, 5 and 6 comprises a rotary slider 41 where the detent clip 3 is attached, a floating slider 42 and two coil springs 43. The coil springs 43 elastically couple the floating slider 42 and the rotary slider 41 such that the floating slider 42 is movable in relation to the rotary slider 41 and consequently in relation to the guiding tube 5 and screen 2, in a direction orthogonal to the sliding direction X. The coil springs 43 push the floating slider 42 against an inner surface of the guiding profile 5 compensating possible misalignments between the floating slider 42 and the guiding profile 5, and assures a regular and steady effort for sliding the screen 2 over the carrier 4.

As shown in FIGS. 4, 5 and 6 the floating slider 42 comprises first retention the means 44 engageable with second retention means 24 provided in the screen 2 at the first run end 21 as shown in FIG. 1.

The sun visor, as represented in FIGS. 1, 2, 3 and 7, comprises third retention means 45 engageable with fourth retention means 65 provided in a plug 6 of the screen 2 at the second run end 22 as shown in FIG. 2.

The first retention means 44 are mounted in the floating slider 42 such that the first retention means 44 are engageable to the second retention means 24 by a movement of the floating slider 42 in a direction orthogonal to the sliding direction X against the force exerted by the coil springs 43. The first retention means 44 comprise a first cam slope 46 to transform an axial sliding movement of the floating slider 42 into a movement orthogonal to the axial sliding movement. The first retention means 44 further comprise a second cam slope 47, opposite to the first cam slope 46, to transform an axial sliding movement of the floating slider 42 into a movement orthogonal to the axial sliding movement. The second retention means 24 further comprise a third cam slope 27 for sliding upon the second cam slope 47 to easy the disengagement movement.

Figure 8A:
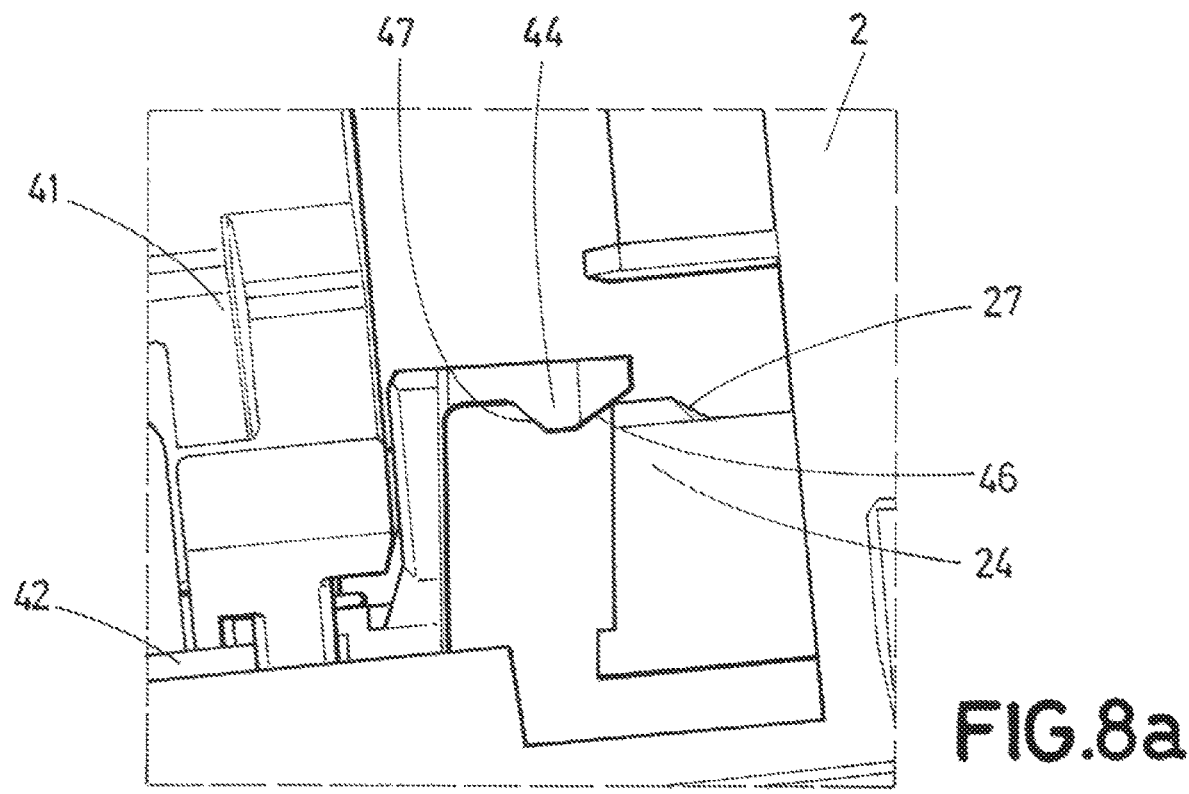
FIGS. 8A, 8B and 8C show steps of coupling the first retention means with the second retention means.
Figure 8B:
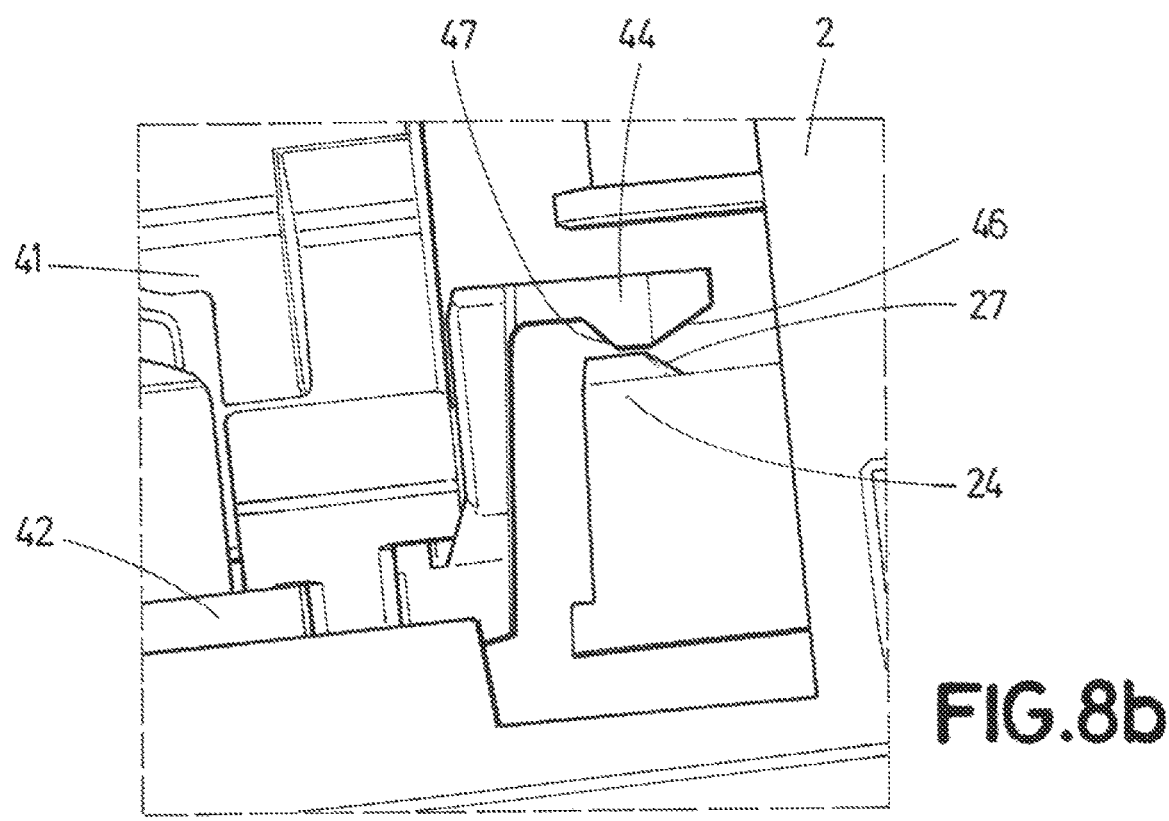
Figure 8C:
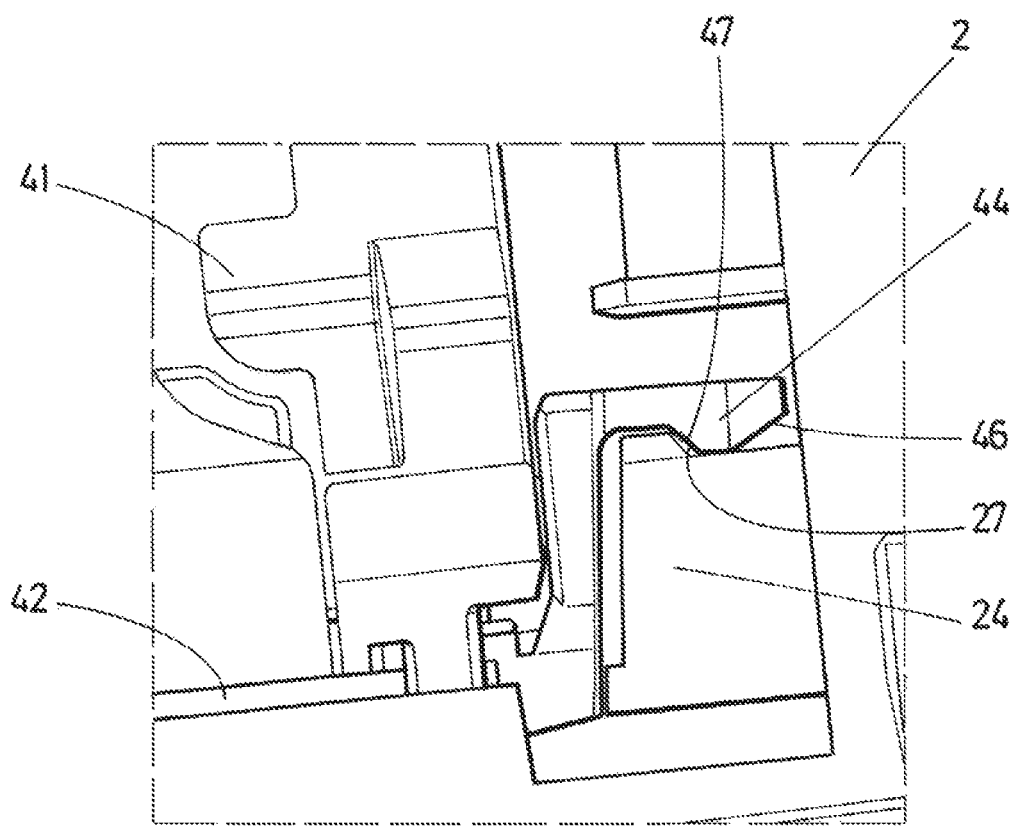

According to the disclosure the engagement in the first end position shown in FIG. 1 will be as follows: the screen 2 slides (to the left in FIG. 1) until it reaches the proximity of the first run end 21 as shown in FIG. 8A, where the second retention means 24 of the screen 2 collide with the first retention means 44 of the carrier 4. A further axial movement of the screen 2 along the rod 1 provokes a first movement of the floating slider 42 in a direction orthogonal to the sliding direction, while the second retention means 24 slides upon the cam slope 46 of the first retention means 44, as shown in FIG. 8B. A further axial movement of the screen 2 provokes a second movement of the floating slider 42 in a direction orthogonal to the sliding direction, but opposite to the first movement, while the second cam slope 47 of the first retention means 44 slides upon the third cam slope 27 of the second retention means 24, as shown in FIG. 8C. In this position the first retention means 44 and the second retention means 24 are engaged, and the floating slider 42 is again at its lower orthogonal position.

The engagement at the second end position is similar to the engagement at the first end position, and it is not described in detail.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A vehicle sun visor with slide on rod function comprising:
   an L-shaped rod rotatably attached to the vehicle, and
   a screen rotatably mounted on the rod and slidable on the rod along a sliding direction parallel to a longitudinal axle of the rod,
   a detent clip coupled to the rod to establish controlled and stable predefined rotational positions of the screen defining at least a screening position and an inoperative position, and
   a carrier rotatably attached to the rod and housed in a guiding profile of the screen, between two run ends, such that the guiding profile guides the sliding movement of the screen between the two run ends, defining a first end position, where the screen is not extended in relation to the rod, and a second end position where the screen is extended, the carrier comprising:
   a rotary slider where the detent clip is attached, configured to rotate around the rod but without sliding along the rod,
   a floating slider, and
   a metal spring elastically coupling the floating slider and the rotary slider such that the floating slider is movable in relation to the rotary slider in a direction orthogonal to the sliding direction;
   and wherein the carrier comprises first retention means engageable with second retention means provided in the screen at one of the run ends of the screen, wherein the first retention means are mounted in the floating slider such that the first retention means are engageable to the second retention means by a relative movement of the floating slider in relation to the screen, in the direction orthogonal to the sliding direction, against the force exerted by the metal spring.

2. The vehicle sun visor recited in claim 1, wherein the floating slider has third retention means and the screen has fourth retention means, the third retention means are at an opposite end of the floating slider of that of the first retention means.

3. The vehicle sun visor recited in claim 2, wherein the floating slider is symmetrical.

4. The vehicle sun visor recited in claim 1, wherein the first retention means comprise a hook or a housing.

5. The vehicle sun visor recited in claim 4, wherein the hook or housing comprises a cam slope.

6. The vehicle sun visor recited in claim 1, wherein the second retention means comprise a hook or a housing.

7. The vehicle sun visor recited in claim 6, wherein the hook or housing comprises a cam slope.

8. The vehicle sun visor recited in claim 1, wherein the metal spring is a coil spring.

9. The vehicle sun visor recited in claim 1, wherein a stiffness of the metal spring is chosen to assure a desired predefined detachment and clipping forces at one of the run ends.

10. A vehicle comprising the vehicle sun visor recited in claim 1.

* * * * *